United States Patent

Miyamoto et al.

[11] Patent Number: 5,866,061
[45] Date of Patent: Feb. 2, 1999

[54] METHOD OF MANUFACTURING CONTAINERS FOR DISPENSING SOLUTIONS

[75] Inventors: Tetsuji Miyamoto, Moriguchi; Mitsuhiro Tadano, Tokyo-to, both of Japan

[73] Assignee: Nissho Corporation, Osaka-fu, Japan

[21] Appl. No.: 895,889

[22] Filed: Jul. 17, 1997

Related U.S. Application Data

[63] Continuation of Ser. No. 556,469, Nov. 13, 1995, abandoned.

[30] Foreign Application Priority Data

Nov. 24, 1994 [JP] Japan .................................. 6-290133

[51] Int. Cl.$^6$ .................................................. B29C 49/04
[52] U.S. Cl. ........................ 264/524; 264/528; 264/529; 264/541
[58] Field of Search .................................. 264/524, 525, 264/526, 528, 529, 541

[56] References Cited

U.S. PATENT DOCUMENTS

| | | | |
|---|---|---|---|
| 2,991,500 | 7/1961 | Hagen | 264/524 |
| 3,114,932 | 12/1963 | Donnelly | 264/541 |
| 3,327,035 | 6/1967 | Parfrey | 264/524 |
| 3,690,804 | 9/1972 | Nave | 264/529 |
| 3,728,063 | 4/1973 | Langecker | 264/524 |
| 3,809,768 | 5/1974 | Berry | 264/525 |
| 3,817,783 | 6/1974 | Dardaine et al. | 264/525 |
| 3,888,961 | 6/1975 | Schonewald | 269/528 |
| 5,002,718 | 3/1991 | Tanaka et al. | |
| 5,068,075 | 11/1991 | Dundas et al. | 264/524 |
| 5,256,346 | 10/1993 | Feuerherm | 264/541 |

FOREIGN PATENT DOCUMENTS

| | | | |
|---|---|---|---|
| 1491316 | 11/1967 | France . | |
| 2405809 | 6/1979 | France | 264/528 |
| 974596 | 11/1964 | United Kingdom | 264/541 |
| 1474044 | 5/1977 | United Kingdom . | |

*Primary Examiner*—Catherine Timm
*Attorney, Agent, or Firm*—Birch, Stewart, Kolasch & Birch, LLP

[57] ABSTRACT

Method of manufacturing containers for dispensing solutions, includes the steps of: (a) extruding a parison from a die while injecting supporting air into the parison, and sealing a forward part of the extruded parison; (b) forming a middle portion of the parison constituting a barrel portion of a container to be produced, during extrusion of the parison, so as to have a wall thickness thinner than the forward part of the parison; (c) injecting air into the parison, after being inserted into a mold with a vacuum mechanism, to blow it out while keeping a pressure in the interior of the mold to a value lower than an internal pressure of the parison, and cutting off the parison from the die to form a container, (d) inserting a mandrel into the molded container through a cut opening of the container after transferring the mold retaining the molded container to a solution-charging station and charging a medical solution into the molded container; and (e) pulling the mandrel out of the container after charging a medical solution into the molded container, and sealing the opening of the solution-charged container.

1 Claim, 7 Drawing Sheets

5,866,061

METHOD OF MANUFACTURING CONTAINERS FOR DISPENSING SOLUTIONS

This application is a continuation of application Ser. No. 08/556,469 filed on Nov. 13, 1995, now abandoned.

BACKGROUND OF THE INVENTION

1. Field of the Invention

The present invention relates to a method of manufacturing containers for dispensing solutions and, more particularly, to a method of manufacturing transfusion containers by blow molding, without causing contamination of a charged medical solution with impurities.

2. Description of the Prior Art

Heretofore various methods have been used for manufacturing containers for dispensing solutions, such as transfusion containers. A primitive method comprises the steps of sealing two sheets of thermoplastics with heat along three sides thereof to form a container and providing an opening of the remaining sides of the resultant container with a mouth member for sealing the produced container. Another method comprises the steps of sealing one open end of a tubular member of thermoplastics with heat and then providing the other open end thereof with a mouth member for sealing the produced container. Another method is a blow molding technique in which a container is directly produced from thermoplastic resins. Among them, the blow molding is now widely used as it has an advantage such that a produced container can be filled with a medical solution and then sealed with the attachment of a mouth member during manufacture of containers for dispensing solutions.

However, the blow molding of the prior art requires use of a complex device since both the blowing and charging steps must be carried out with a blowing mandrel provided with a charging nozzle. For example, as illustrated in FIG. 9, the blow molding equipment of the prior art comprises a blowing mandrel 600 and a reciprocating charging core 603 coaxially arranged therein and movably supported by packing 604. The charging core 603 is closed by a valve 601 with a sealing packing 602 during formation of a container but opened when injecting vapor, washing liquid or air into a produced container.

Such a structure makes the molding equipment complex in structure and increases the diameter of a mandrel, which in turn causes a limit on the head shape of containers to be produced and makes it difficult to perform fine control of the molding conditions. Also, it takes a long time for maintenance of the device. In addition, there is a fear of contamination of charged medical solutions with dusts resulting from wear or degradation of the packing since the reciprocating charging core has to be held in the mandrel and sealed by the packing 604 to avoid leakage of vapor, washing liquid or air into the core.

In addition, in the blow molding of the prior art the inflation has been carried out by cutting the parison after inserting it into the mold, the parison may come into contact with the inside of the mold, which causes whitening of the surface of the produced container.

SUMMARY OF THE INVENTION

It is therefore an object of the present invention to provide a method of manufacturing containers for dispensing solutions, which is free from limitation on the shape of a head portion of the containers, intrusion of foreign materials into the containers, whitening of a surface of a container, and is easy to perform fine control of molding conditions and maintenance of the molding equipment.

The above and other objects of the present invention are achieved by providing a method of manufacturing containers for dispensing solutions, including the steps of:

(a) extruding a parison from a die while injecting supporting air into the parison, and sealing a forward part of the extruded parison;

(b) forming a middle portion of the parison constituting a barrel portion of a container to be produced, during extrusion of the parison, so as to have a wall thickness thinner than the forward part of the parison;

(c) injecting air into the parison, after being inserted into a mold with a vacuum mechanism, to blow it out while maintaining pressure in the interior of the mold to a value lower than an internal pressure of the parison, and cutting off the parison from the die to form a container, (d) inserting a mandrel into the molded container through a cut opening of the container after transferring the mold retaining the molded container to a solution-charging station, and charging a medical solution into the molded container; and (e) pulling the mandrel out of the container after charging a medical solution into the molded container, and sealing the opening of the solution-charged container.

The parison may be preliminarily inflated at its thinned portion before inflation in the step (c). Also, in order to make a barrel portion of a container to be produced thin, a middle portion of the parison may be formed so as to have a thin wall thickness by slightly inserting the die core into the interior of the parison during extrusion of the parison. Further, the parison may be formed into a container while preventing it from an excess internal pressure by use of a mandrel provided at its outer wall with one or more grooves which allow the air to flow out of the parison.

According to the present invention, the blow molding is carried out as soon as the parison is inserted into the mold, thus making it possible to prevent the container from whitening. Further, no contamination with foreign materials due to deterioration or wear of packing members takes place since the mandrel has no charging core with a reciprocating motion. Accordingly, it is possible to aseptically manufacture containers for dispensing solutions. The method of the present invention makes it possible to simplify the structure of the mandrel and pipelines of the blow molding equipment, which in turn makes it easy to perform fine adjustments of molding conditions and maintenance of the equipment. Since the mandrel is small in diameter, it is possible to design a head of the container to any desired shape.

BRIEF DESCRIPTION OF THE DRAWINGS

The present invention is described in detail with reference to the accompanying drawings illustrating preferred embodiments thereof, throughout which like parts are designated by like reference numerals, and in which.

DETAILED DESCRIPTION OF THE PREFERRED EMBODIMENTS

FIGS. 1 to 7 are diagrammatic sectional views of a blow molding equipment illustrating a series of steps of manufacturing containers charged with a medical solution according to one embodiment of the present invention.

Figure 5:
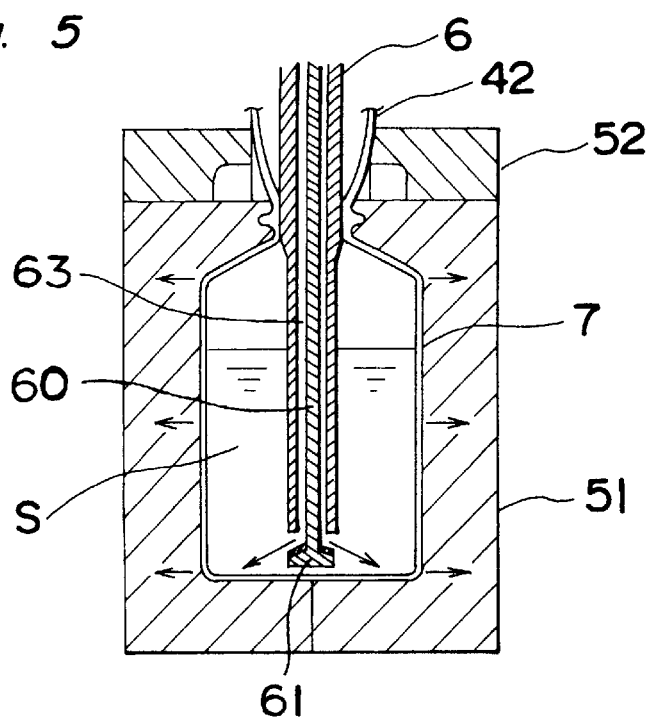
FIG. 5 is a diagrammatic view illustrating a step of charging the container with a medical solution; by blow molding.
Figure 6:
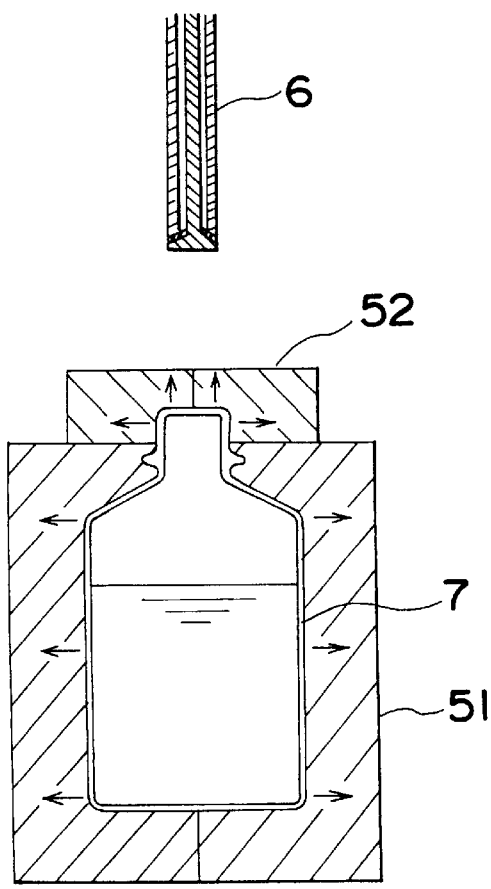
FIG. 6 is a diagrammatic view illustrating a step of sealing the container charged with a medical solution.
Figure 7:
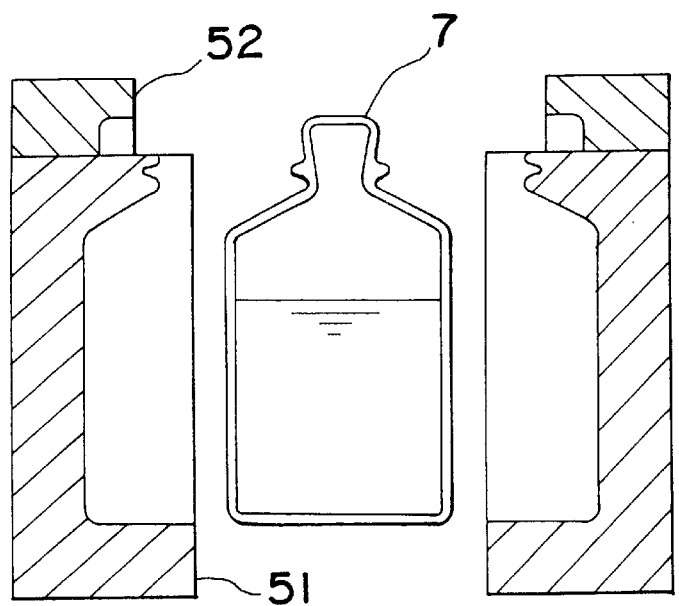
FIG. 7 is a diagrammatic view illustrating a step of extracting a finished transfusion container.
Figure 8:
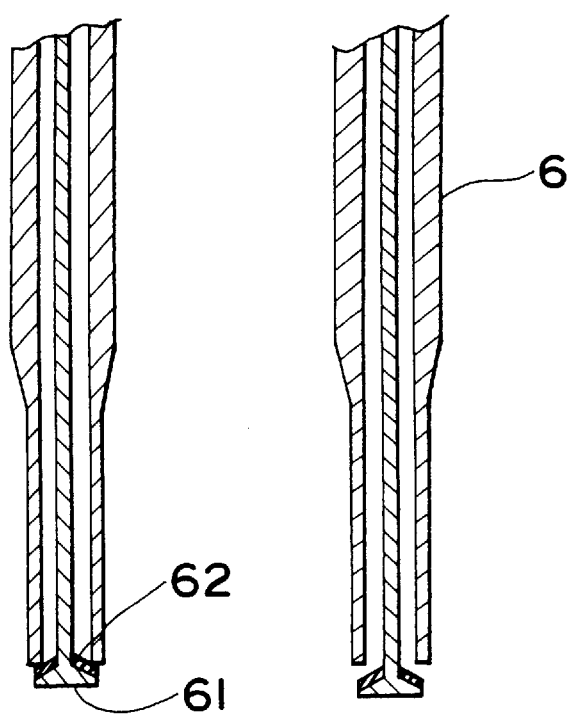
FIG. 8 is an axial sectional view of a mandrel of the equipment employed in the present invention.
Figure 9:
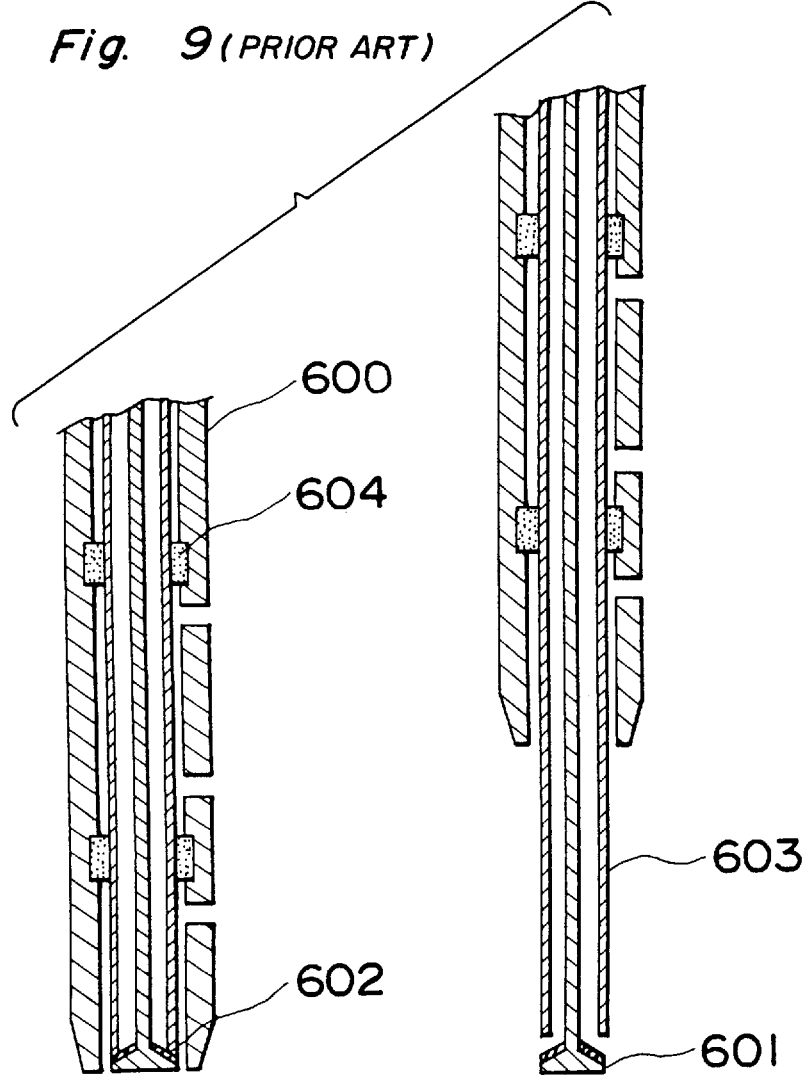
FIG. 9 is an axial section of a mandrel used in a blow molding equipment of the prior art.

As illustrated in FIGS. 1 to 7, a method of manufacturing containers for dispensing solutions, according to the present invention, includes an extrusion step extruding a parison 4 (FIG. 1), a wall thickness control step in which a wall thickness of the parison 4 is controlled (FIG. 2), a blow molding step in which the parison 4 is inflated inside a mold by blowing air into the parison 4 (FIG. 4), a charging step in which the molded container is charged with a medical solution (FIG. 5), a sealing step in which a mouth of the solution-charged container is sealed (FIG. 6), and an ejecting step in which the finished container is ejected from the mold (FIG. 7).

Figure 3:
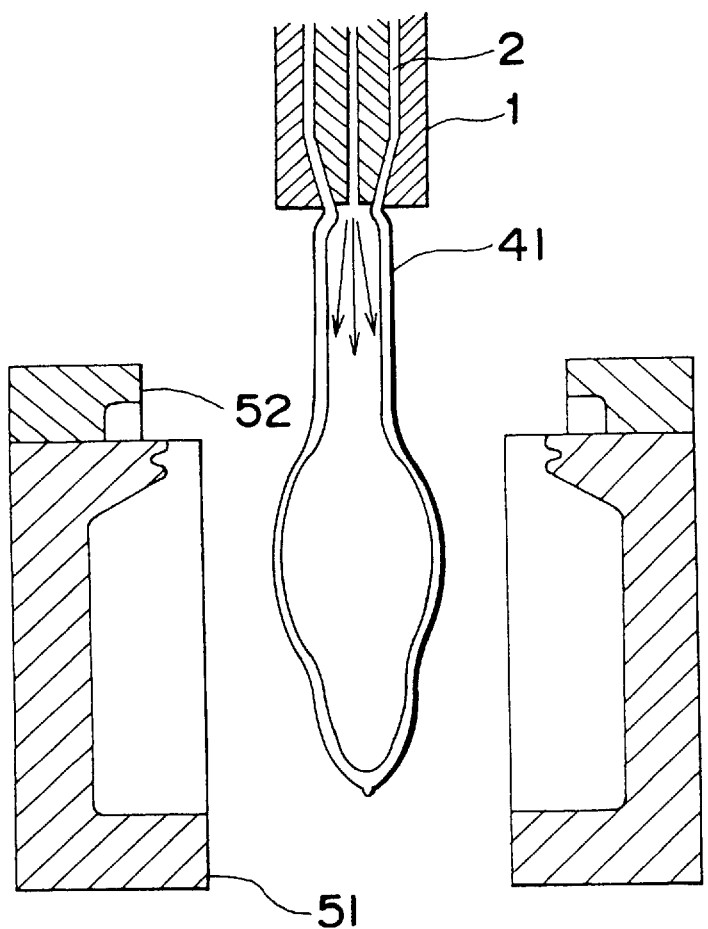
FIG. 3 is a diagrammatic view illustrating a step of preliminarily inflating the parison of FIG. 1.

In this embodiment of the present invention, the process further includes a preblowing step between the wall thickness control step and blow molding step, as illustrated in FIG. 3.

Figure 1:
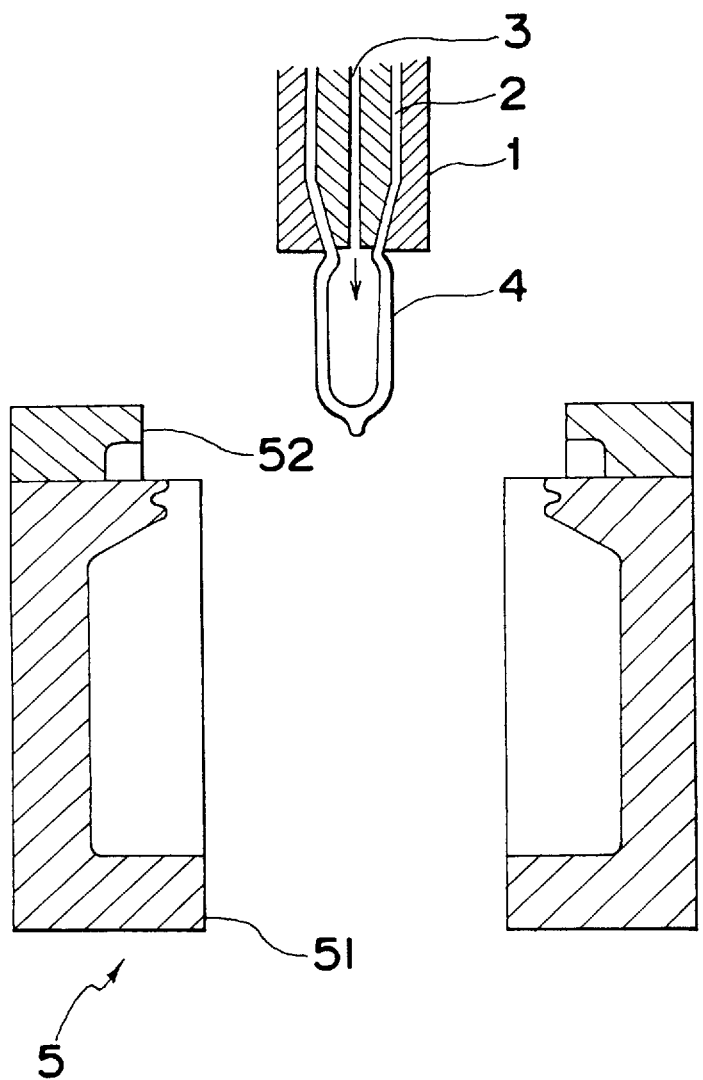
FIG. 1 is a diagrammatic view illustrating a step of formation of a parison according to one embodiment of the present invention.
Figure 2:
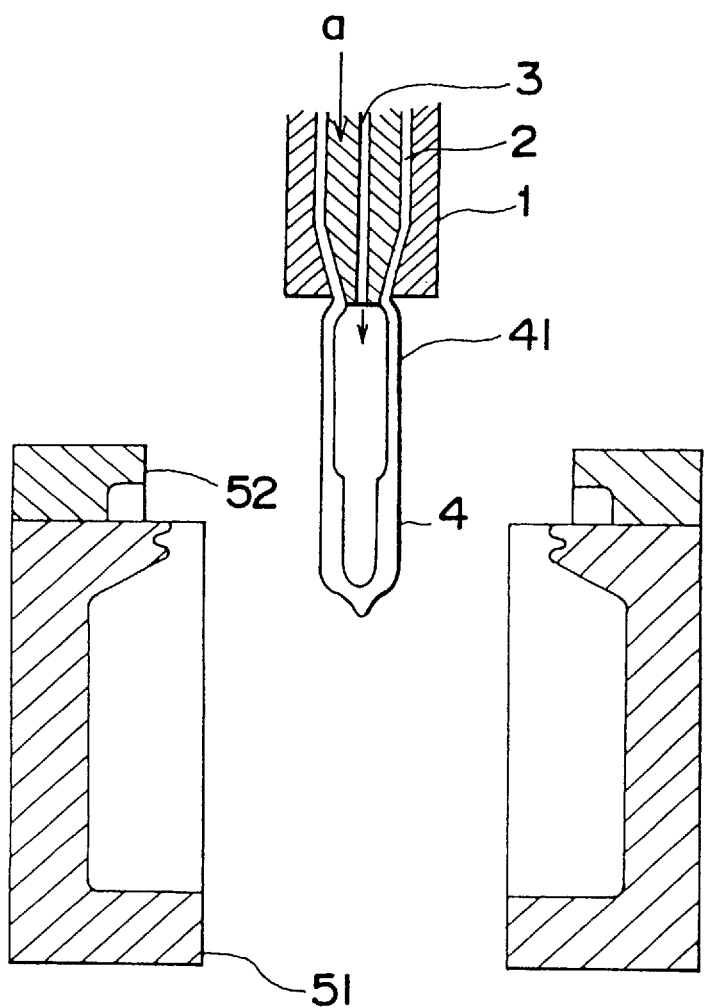
FIG. 2 is a diagrammatic view illustrating a step of forming a middle part of the parison which follows a lower part of the parison of FIG. 1.

In the parison extrusion step shown in FIG. 1, a tubular parison 4 is extruded from a die 1 including a die core 2. In the initial stage of extrusion, the parison 4 is sealed at its forward end by a clamp (not shown in the Figure) and further extruded while feeding a supporting air into the parison 4 through an axial air passage 3 of the core 2 to hold it in a tubular form. During formation of the parison 4, the core 2 of the die 1 is slightly moved in the direction indicated by an arrow a, while injecting the supporting air into the parison 4, until the front part of the die core 2 protrudes into an interior of the parison 4 as shown in FIG. 2, to reduce a gap between the die 1 and core 2. Thus, a middle part of the parison 4, which constitutes a barrel portion of a container 7 to be produced, is controlled to a wall thickness thinner than the forward part (hereinafter referred to as "parison control"). The parison control may be done by use of a radially compressible die which can be reduced in diameter of the opening when extruding a part of the parison corresponding to the barrel portion of the container. After forming the middle portion of the parison 4, the core 2 is returned to its initial position where the front surface of the core 2 is in the same plane as the front surface of the die 1, as shown in FIG. 3.

Figure 4:
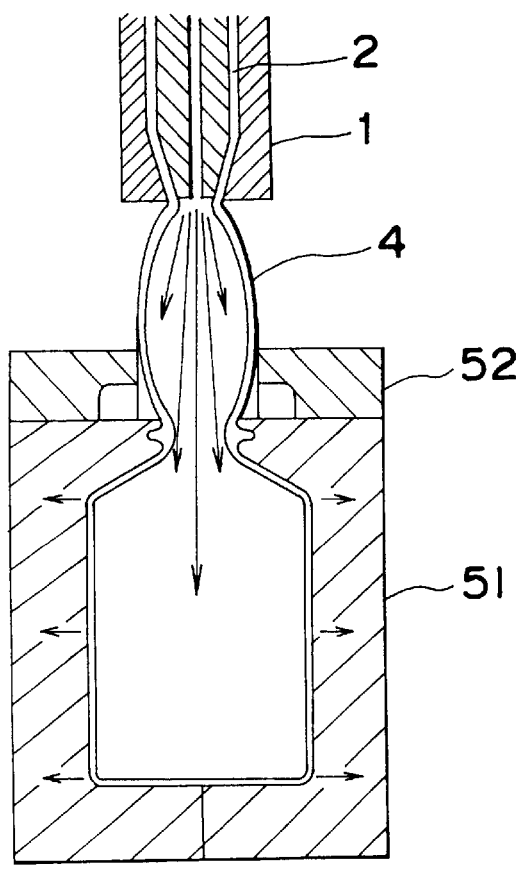
FIG. 4 is a diagrammatic view illustrating a step of inflating the parison of FIG. 1 into a container by blow molding.

Thus prepared parison 4 with a controlled wall thickness may be directly transferred to the blow molding step as shown in FIG. 4. Preferably, the parison 4 is treated by a preblowing step shown in FIG. 3. In this step, the middle portion with a thin wall thickness is inflated by injecting preblowing air into the interior of the parison 4 through the core 2 so that the middle portion of the parison 4 with a controlled wall thickness is further thinned. Then, the process proceeds to the blowing molding step shown in FIG. 4.

In the blow molding step, the parison 4 is inserted into a lower mold 51 with a evacuating means (not illustrated in the figure) and the mold 51 is then closed as shown in FIG. 4. While keeping an internal pressure of a cavity of the closed mold to a value lower than an internal pressure of the parison 4 by means of the vacuum mechanism, the parison 4 is shaped into a bottle-shaped parison by injecting air into the parison 4 through the core 2 to blow it out against the mold 51. After blow molding, the parison 4 is cut off from the die 1 at its neck portion with a cutter (not illustrated in the figure) to form a molded container 7.

Then, the mold 51 is transferred to a solution-charging station where the next solution-charging step is carried out. The container 4 in the mold 51 has a cut opening 42 through which a mandrel 6 is inserted into the container 7. Then, a predetermined amount of a medical solution S is charged into the container 7 as shown in FIG. 5. After charging the container with the medical solution, the mandrel 6 is withdrawn from the container 7 and the opening of the container 7 is sealed by closing an upper mold 52 as shown in FIG. 6. Differing from the mandrel of the prior art, the mandrel 6 by itself serves as a charging core. To this end, the mandrel 6 is provided with a core shaft 60 having a valve 61. The valve 61 is provided with a sealing packing 62 to close a passage 63.

During the sealing step in which the opening of the container 7 is sealed, the interior of the mold 5 is held at a pressure lower than the interior of the container 7 by means of the vacuum mechanism. After completing a transfusion container 7, the process proceeds to the next ejecting step in which the produced container 7 is taken out of the mold by opening the mold 5 as shown in FIG. 7.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method of manufacturing containers for dispensing solutions, including the steps of:

(a) extruding a parison from a die having a front surface and including a die core also having a front surface movably arranged in said die, while feeding supporting air into the parison being extruded, and sealing a tip portion of the extruded parison at the initial stage of the extrusion;

(b) while controlling a wall thickness of the parison during extrusion of the parison, the parison is preliminarily inflated, the front surface of said die core moves to a position out of a plane by slightly inserting the die core into the interior of the parison so that a middle portion of the parison, which constitutes a barrel portion of a container to be produced, has a wall thickness thinner relative to the tip portion of the parison, and after forming the middle portion, the core is returned to an initial position where the front surfaces of said die and die core lie in said plane;

(c) inserting the parison into a mold provided with a vacuum mechanism and injecting air into the parison through the core of said die to inflate the parison against the mold and thereby form an inflated parison, said air being injected as soon as the parison has been inserted into the mold to prevent whitening of the parison, while keeping an internal pressure of the mold lower relative to the pressure within the parison, and cutting off the inflated parison from the die to form an opening;

(d) inserting a mandrel separate from said die and die core serving as a charging means into the inflated parison held in the mold through said opening in the inflated parison, said mandrel provided with a core shaft having a valve and a passage, said valve having a sealing packing to close said passage, and charging a solution into said inflated parison through said mandrel; and (e) pulling said mandrel out of the charged parison, and sealing the opening of the charged parison to complete a container.

\* \* \* \* \*